United States Patent
Przybyla (10) Patent No.: US 10,634,544 B1
(45) Date of Patent: Apr. 28, 2020

(54) ULTRASONIC SHORT RANGE MOVING OBJECT DETECTION

(71) Applicant: Chirp Microsystems, Inc., Berkeley, CA (US)

(72) Inventor: Richard J. Przybyla, Berkeley, CA (US)

(73) Assignee: CHIRP MICROSYSTEMS, Bereley, CA (US)

( * ) Notice: Subject to any disclaimer, the term of this patent is extended or adjusted under 35 U.S.C. 154(b) by 438 days.

(21) Appl. No.: 15/454,363

(22) Filed: Mar. 9, 2017

Related U.S. Application Data (60) Provisional application No. 62/309,646, filed on Mar. 17, 2016.

(51) Int. Cl.
G01F 23/296 (2006.01)

(52) U.S. Cl.
CPC .................. *G01F 23/2962* (2013.01)

(58) Field of Classification Search
CPC .................................................. G01F 23/2962
USPC ............................................................ 367/99
See application file for complete search history.

(56) References Cited

U.S. PATENT DOCUMENTS

| | | | |
|---|---|---|---|
| 7,281,082 B1 | 10/2007 | Knapp | |
| 10,012,730 B1* | 7/2018 | Wu | G01S 15/88 |
| 2006/0202885 A1 | 9/2006 | Chen | |
| 2010/0309225 A1 | 12/2010 | Gray et al. | |
| 2012/0242400 A1 | 9/2012 | Shaeffer et al. | |

FOREIGN PATENT DOCUMENTS

WO 2016019317 A1 2/2016

OTHER PUBLICATIONS

Co-Pending U.S. Appl. No. 62/309,646, to Richard J. Przybyla, filed Mar. 17, 2016.
Shin et al. "Acoustic Doppler velocity measurement system using capactive micromachined ultrasound transducer array technology." The Journal of the Acoustical Society of America 134.2 (2013): 1011-1020. [online] 2013 [retrieved on Oct. 4, 2015 (Oct. 4, 2015)] Retrieved from the Internet <http:www.tufts.edu/~rwhite07/PRESENTATIONS_REPORTS/JASMAN13421011_1.pdf> entire document, especially abstract, Fig. 2, 4, 12, Table 1 and p. 1011-1012.
Przbyla, et al. "An ultrasonic rangefinder based on an AIN piezoelectric micromachined ultrasound transducer." Sensors, 2010 IEEE. IEEE, 2010 [retrieved on Oct. 4, 2015 (Oct. 4, 2015)] Retrieved from the Internet. <http://rjprzy.com/publications/przbyla_IEEEsensors2010.pdf> entire document, especially Fig 5 and p. 1-2 , pp. 1-3 Only.

* cited by examiner

*Primary Examiner* — Daniel L Murphy
(74) *Attorney, Agent, or Firm* — JDI Patent; Joshua Isenberg; Robert Pullman (57) ABSTRACT

An ultrasonic transceiver can detect the presence of nearby moving objects while rejecting signals from stationary targets and from transmitter signal feedthrough. Data corresponding to received ultrasound signals are stored in a digital memory. For each sample in a measurement, a difference is calculated between corresponding samples in the stored data corresponding to received signals for current and previous measurements to estimate a time of flight to a moving object.

19 Claims, 8 Drawing Sheets

ULTRASONIC SHORT RANGE MOVING OBJECT DETECTION

CLAIM OF PRIORITY

This application claims the benefit of U.S. Provisional Application No. 62/309,646, filed Mar. 17, 2016, the entire contents of which are incorporated herein by reference.

STATEMENT REGARDING FEDERALLY SPONSORED RESEARCH OR DEVELOPMENT

This invention was made with Government support under IIP-1456376 awarded by the National Science Foundation. The Government has certain rights in this invention. 45 CFR 650.4(f)(4)

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

Ultrasonic pulse echo rangefinding is used to detect nearby objects. Ultrasonic pulse-echo measurements bounce sound off the object and measure the time-of-flight (ToF) of the echo. The ToF can be converted into the range to the object by multiplying by half the speed of sound.

In situations where the ultrasonic rangefinder is located near an object, the ultrasonic transmit pulse may interfere with the ultrasonic echo signal, preventing accurate readout when the object is nearby. Furthermore, in some applications, non-moving objects within the rangefinder's field of view should not be detected, and only moving objects should be reported.

Therefore, a new signal processing technique is required to address these shortcomings in the state of the art. It is within this context that aspects of the present disclosure arise.

SUMMARY

This disclosure relates generally to ultrasonic pulse-echo range sensing and specifically to a system and a method to measure the range to moving objects using an ultrasonic transceiver.

DETAILED DESCRIPTION

A system to detect the range to nearby moving objects is disclosed. The current invention teaches how to use an ultrasonic transceiver to measure the distance between the ultrasonic transceiver and the moving object nearby it.

Figure 1A:
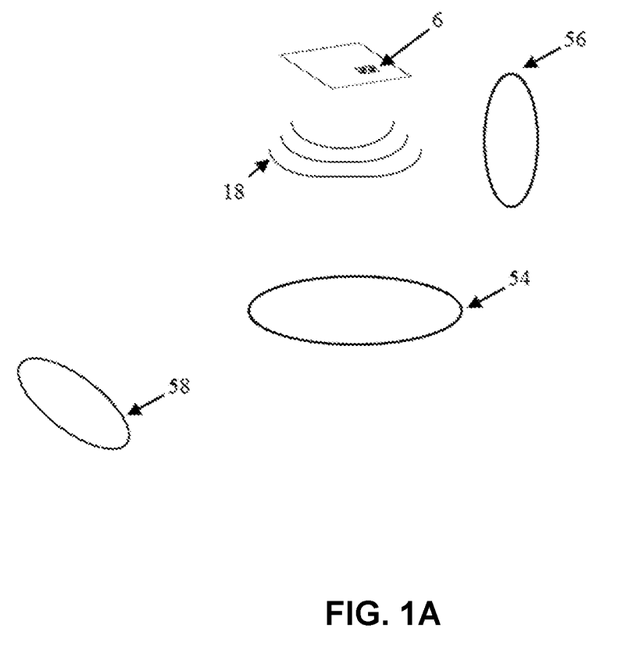
FIG. 1A shows a schematic view of a ultrasonic transceiver, a moving target, and a stationary target.

FIG. 1 shows a schematic diagram of an ultrasonic transceiver 6 near three objects 54, 56, 58. In one instance, object 54 may be in motion and object 56, 58 may be stationary. Ultrasonic transceiver 6 emits ultrasound pulse 18 portions of which reflect off all three objects. This invention teaches how to measure the range to moving object 54 while ignoring the transmit feedthrough due to the ultrasound pulse 18 and the echo signal from stationary objects 56, 58.

Detail is now provided about signal generation of the ultrasound signal. Ultrasound transceiver 6 contains an ultrasound transducer and an integrated circuit. The transducer is driven by the integrated circuit with a transmit signal composed of a bipolar square wave signal with an amplitude in the range of 1V to 30V and more specifically in the range of 5V to 15V. The transmit signal may be separated into one or more symbols. Each symbol has a duration and a phase. The first symbol is used to excite a sound wave and may have a duration in the range of 1 to 50 cycles of the transducer's resonant frequency, and more specifically in the range of 2 to 30 cycles. The second symbol is used to null the ringing of the transducer after a transmission has concluded, and has a phase shift of 180 degrees relative to the first symbol. The duration of the second symbol may be determined automatically by the integrated circuit by incrementing the duration until a minimum value of the ringing is detected by the integrated circuit's receiver. A third symbol may be used to further null the ringing of the transducer after the second symbol has concluded. The third symbol may have a phase shift of −90 degrees with respect to the first symbol. The duration of the third symbol may also be determined automatically in a similar fashion to the second symbol's duration.

Figure 1B:
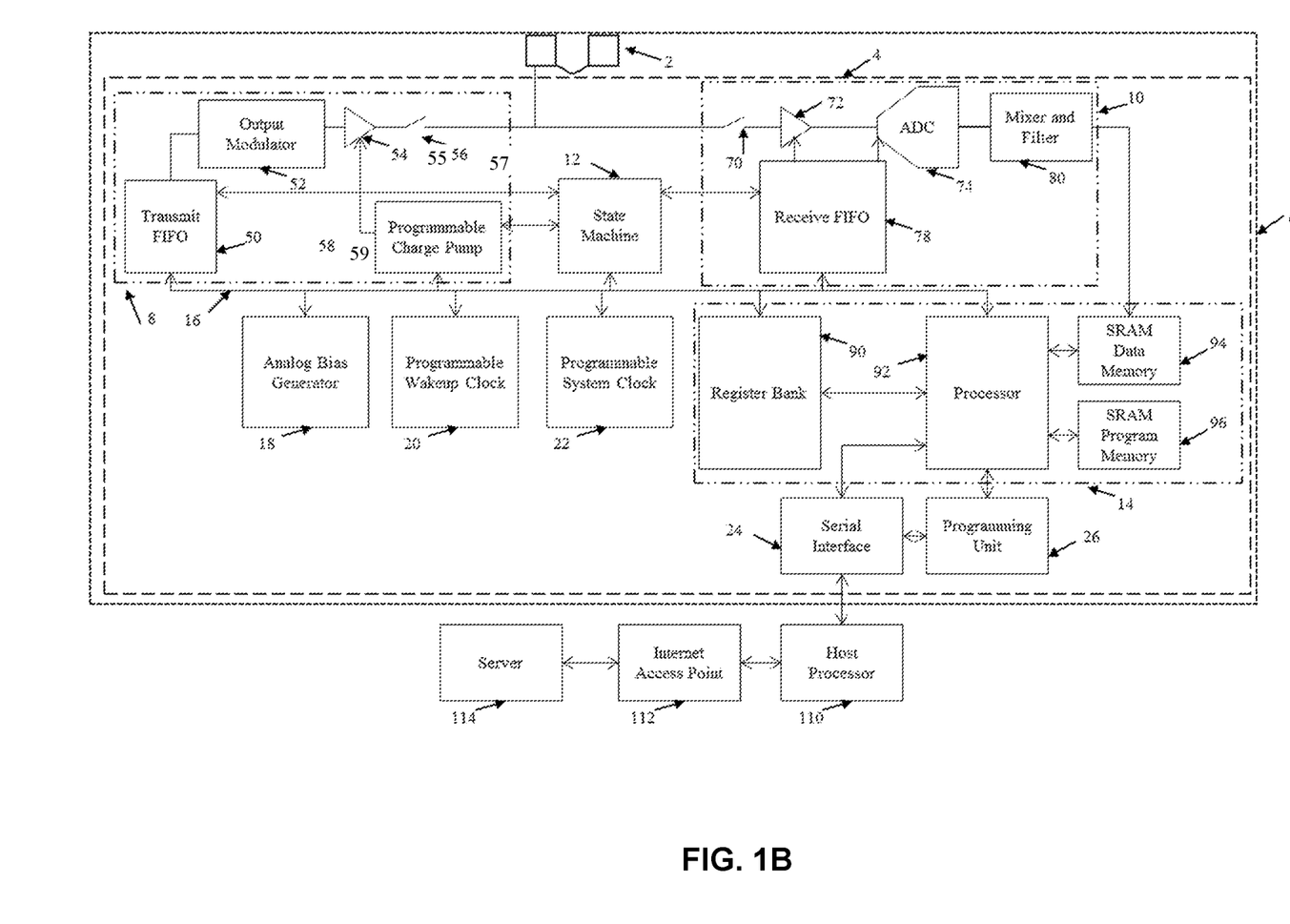
FIG. 1B is a block diagram of a programmable ultrasonic transceiver in accordance with an aspect of the present disclosure.
Figure 1C:
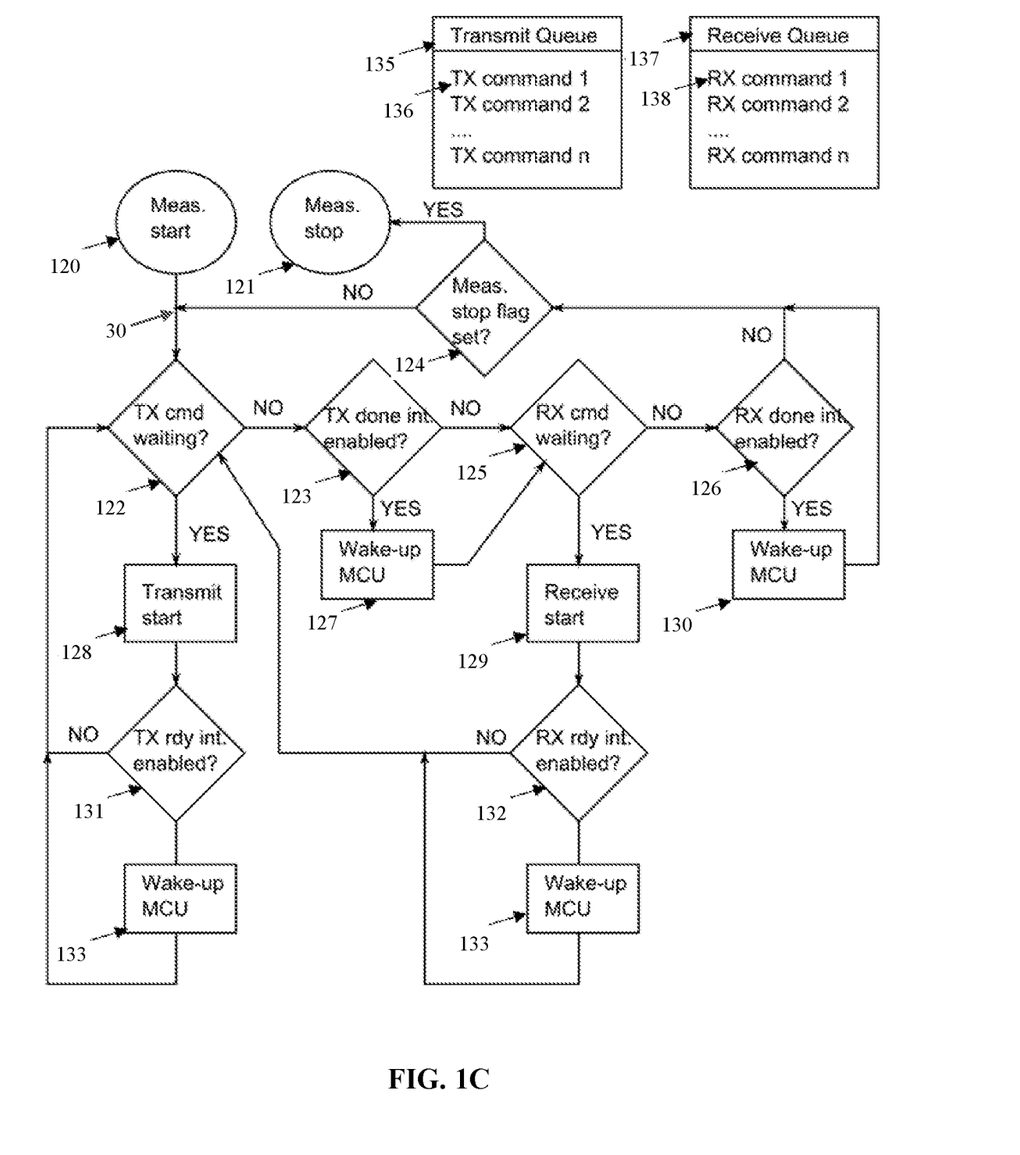
FIG. 1C is a flow diagram illustrating operation of a state machine in the programmable ultrasonic transceiver of FIG. 1B.

FIG. 1A, FIG. 1B and FIG. 1C illustrate a possible implementation of an ultrasonic transceiver according to aspects of the present disclosure. Ultrasonic transceiver 6 contains ultrasonic transducer 2 and electronic assembly 4. Ultrasonic transceiver 6 may consist of a packaged assembly which contains electronic ports and one or more acoustic ports. Ultrasonic transducer 2 may consist of a micromachined ultrasound transducer which consists of a membrane formed over a substrate and which may be actuated using piezoelectric, capacitive, or thermal actuation. Electronic assembly 4 may consist of a single integrated circuit or several integrated circuits and may also contain discrete components. By way of example, and not by way of limitation, the ultrasonic transducer 2 and electronic assembly may be configured as described in International Patent Application Number PCT/US2015/043256, filed Jul. 31, 2015 and published on Feb. 4, 2016 as International Application Publication WO 2016/019317, the entire contents of which are incorporated herein by reference.

In an embodiment, electronic assembly 4 contains a transmitter block 8, a receiver block 10, a state machine 12, and a central computing unit 14. By way of example, and not by way of limitation, the central computing unit 14 may include an 8051 microcontroller core or an ARM processor core. The electronic assembly 4 may also include a peripheral bus 16, an analog bias generator 17, a programmable wakeup clock 20, a programmable system clock 22, a data interface 24, e.g., a serial interface, and a programming unit 26. In some embodiments, the interface 24 may be a parallel interface or one or more wires carrying a modulated carrier used to encode digital data.

In one embodiment, transmitter block 8 contains a buffer 50 (e.g., first-in-first-out (FIFO)) which holds transmit commands. Each transmit command controls an output modulator 52 which controls the amplitude, phase, and duration of the output signal. Amplifier 55 and transmit switch 57 control the output voltage signal which is applied to ultrasonic transducer 2. A programmable charge pump 59 boosts the input voltage supply level from the input range of 0.5 to 5 volts to the output range of 5 to 60 volts and more specifically from the input range of 1 to 3.3 volts to the output range of 10 to 30 volts.

A receiver block 10 contains a receive switch 70 which blocks the high voltage transmit signal from the low noise receive amplifier 72. A receive buffer 78, e.g., first-in-first-out register (receive FIFO) holds receive commands which control the gain and time constant of the low noise receive amplifier 72 and the analog to digital converter (ADC) 74. In some embodiments, the receive FIFO may be omitted or may be replaced with an indexed register bank. The input signal is amplified and digitized by the low noise amplifier 72 and the ADC 74. The digital output signal is quadrature demodulated and filtered by mixer and filter block 80.

Receiver block 10 and transmitter block 8 are controlled by state machine 12. State machine 12 controls the sequencing of transmission and reception of the signals by controlling transmit buffer 50, output modulator 52, transmit switch 56, receive switch 70, and receive buffer 78. State machine 12 retrieves commands from the transmit buffer 50 and controls the transmitter block 8 to execute them for a duration specified within each command. After each command, the state machine 12 fetches a new command from the transmit buffer 50 until it is empty. Subsequently, state machine 12 retrieves commands from the receive buffer 78 and controls the receiver block 10 to execute them for a duration specified within each command. After each command, the state machine 12 fetches a new command from the receive buffer 78 until it is empty. Finally, state machine 12 signals processor 92 to indicate that it is finished. State machine 12 may include a digital counter configured to program the duration of each transmit and receive operation. The output value of the digital counter may be compared to a number contained within the transmit or receive command, as explained further below.

Operation of the state machine 12 is shown in detail in FIG. 1C. The state machine 12 may be implemented in software as a program executed on a general purpose computer processor (e.g., processor 92) or in hardware as a sequential logic circuit implemented, e.g., on an application specific controller (ASIC), field programmable gate array (FPGA), or system on chip (SoC). The state machine 12 is capable of operating autonomously but occasionally needs interaction from the central computing unit 14. Such interaction will be described in detail where appropriate. Additionally, in the illustrated example, there are transmit and receive command queues 135 and 137 that are shared memory resources between the central computing unit 14 and state machine 12. In one non-limiting implementation, the command queues 135, 137 may be implemented as hardware FIFOs, written by the central computing unit 14 and read by the state machine 12. The FIFOs produce signals indicating that (1) new data is ready or (2) there is space available in the FIFO for a new command.

In the example depicted in FIG. 1C, a measurement process is started with the central computing unit 14 issuing a "measurement start" command to the state machine 12. This places the execution flow of the state machine at node 30. The "measurement" terminology used in this example refers to a range measurement, but the state-machine 12 can also be used for transmit-only or receive-only configurations, e.g., for transmitting data from one ultrasonic transceiver to another via ultrasound. After entering the node 120, the execution continues to 122. At this point, if the transmit queue 135 has a new transmit command 136 available, the flow continues to 128, and the transmission corresponding to the new transmit command is started. After starting the transmission, the FIFO implementing the transmit queue 135 has space available for the central computing unit 14 to load a new command. If a special "transmit ready interrupt enable" flag is set at 131, the state machine 12 wakes up the central computing unit 14, as indicated at 133 via a dedicated hardware interrupt. Whether the interrupt being triggered or not, the flow continues back to 122.

If there are no new transmit commands 136 available in the transmit queue 135, flow continues from 122 to 123. If a special "transmit done interrupt enable" flag is set, the state machine 12 wakes up the central computing unit 14, as indicated at 127 (e.g., with a hardware interrupt). Flow then continues to 125.

At this point, if the receive queue 137 has a new receive command 138 available, the flow continues to 129, and the receive action corresponding to the new command is started. After starting the receiver, the FIFO implementing the receive queue 137 has space available for the central computing unit 14 to load a new receive command 138. If a special "receive ready interrupt enable" flag is set at 132, the state machine 12 wakes up the central computing unit 14, e.g., via a dedicated hardware interrupt. Regardless of the interrupt being triggered or not, the flow continues back to 122.

If there are no new commands available in the transmit queue 135 or the receive queue 137, flow continues to 122 to 123 to 125 to 126. If a special "receive done interrupt enable" flag is set, the state machine 12 wakes up the central computing unit 14, e.g., with a hardware interrupt. Flow then continues to 124.

At 124, if a special "measurement stop flag" is set, the measurement process is terminated. Otherwise, flow continues back to 122.

The transmit queue 135 and receive queue 137 contain information about configuration of the physical hardware of the transmitter block 8 and receiver block 10. By way of example, and not by way of limitation, each transmit command 136 may contain information representing a phase, a length of time for transmission, and an amplitude of a transmit waveform; and, each receive command 138 may contain a length of time to receive as well as a gain of the front-end amplifier 72, and an attenuation setting of a front-end attenuator (not shown).

As mentioned previously, the state machine 12 is largely autonomous, requiring only infrequent interaction from the central computing unit 14. This leads to substantial system power savings. The central computing unit 14 loads commands into the queues 135, 137, sets any number of the "special flags" mentioned above, and then goes to sleep. The state machine 12 can then wake-up the central computing unit 14 when it needs further instructions.

The foregoing description of operation of the state machine 12 is non-limiting. According to aspects of the present disclosure, the state machine 12 may implement other features not shown in FIG. 1C. By way of example, and not by way of limitation, an emergency stop flag, if set by the central computing unit 14, may immediately stop the state machine as indicated at 121 and disable the hardware in the transmitter block 8 and receiver block 10. The flow may then be transferred to node 30.

Referring again to FIG. 1B, receiver block 10 may output complex baseband data which is stored in SRAM data memory 94. Processor 92 shares the SRAM data memory 94 and processes the complex baseband data according to the application requirements. Register bank 90 may contain general purpose registers and general purpose input/output ports. Processor 92 controls peripherals through data bus 16. Processor 92 is interfaced to an external host processor 110 through a serial interface 24 which may consist of a protocol such as serial peripheral interface (SPI), inter integrated circuit (I2C) or another proprietary interface protocol using one or more digital or analog output signals. Serial interface 24 controls programming unit 26 which enables processor 92 to load SRAM program memory 96 through serial interface 24.

Host processor 110 is configured to load the SRAM program memory 96 using the serial interface 24, the programming unit 26, and the processor 92. Ultrasonic transceiver 6 may then transmit and receive ultrasound signals according to the current program.

Figure 3:
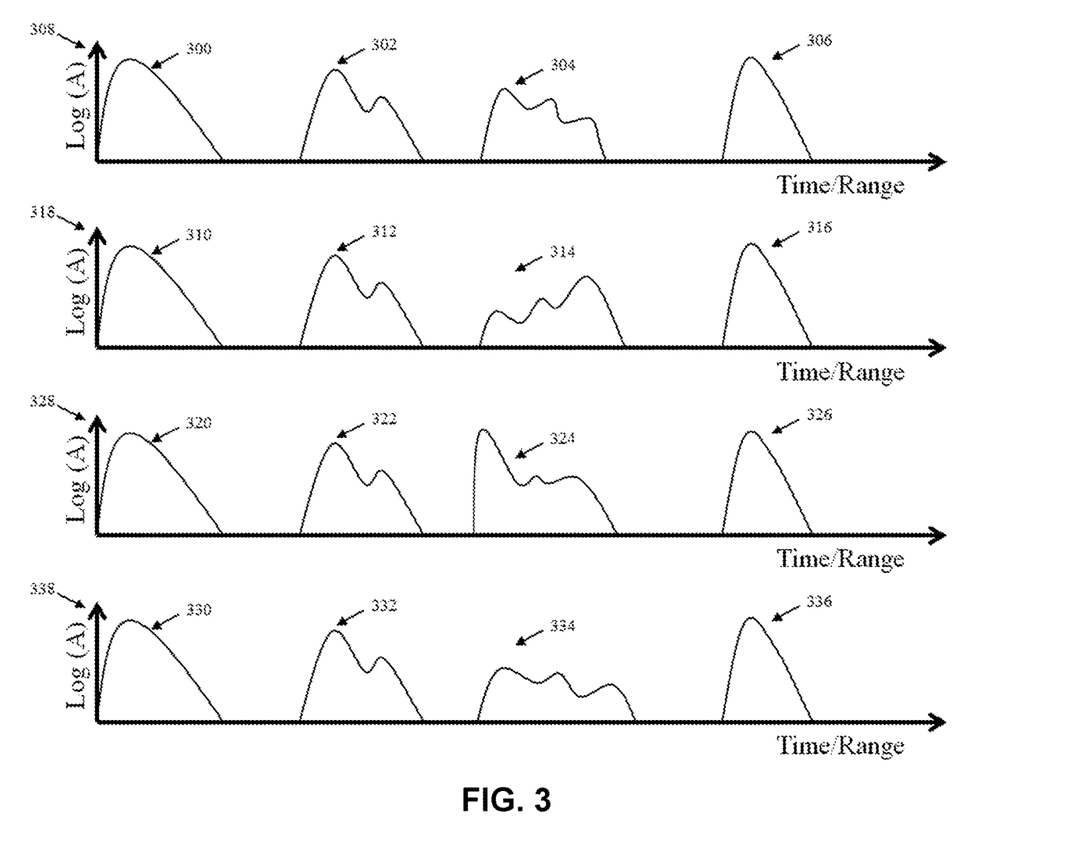
FIG. 3 shows a series of amplitude versus time plots of an ultrasound signal.

Further detail is provided regarding the processing of the received ultrasound signal in FIG. 3. At the beginning of a measurement, an ultrasound signal is transmitted by the ultrasound transceiver 6. Following transmission, the circuitry connected to the transceiver is switched from transmit mode to receive mode; the transmit amplifier is disconnected from the transceiver and the receive amplifier is connected to the transceiver. In receive mode, the output signal from the transducer may be amplified, digitized and saved in memory.

The top plot 308 in FIG. 3, which shows an example of a received time series signal. The vertical axis is the logarithm of the received signal amplitude. The signal from the ultrasound transceiver is first primarily composed of residual ringing 300 from dynamics of the transceiver following transmission. As time progresses, the ringing 300 subsides and echoes 302, 306 from stationary objects 56, 58 and echo 304 from the moving object 54 are received. The second plot 318 shows an example of a second measurement recorded following the first one. In the second plot 318, ringing 310 and echoes 312, 316 from stationary objects 56, 58 are substantially unchanged. The echo 314 from the moving object 54 is substantially different from the initial echo 304 because the moving object 54 has moved since the initial measurement. Similarly, plots 328, 338 show major variation in the amplitude of echoes 324, 334 from the moving object 54 and little or no variation in the amplitude of the ringing signals 320, 330 and the stationary object echo signals 322, 332, 326, 336.

Figure 2:
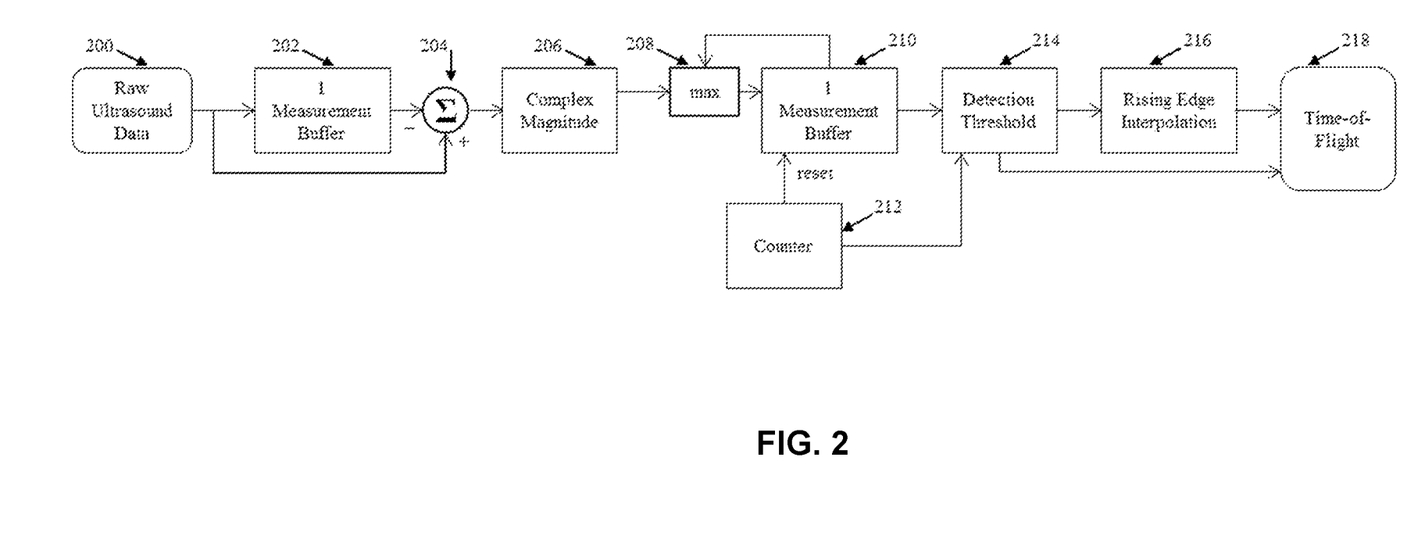
FIG. 2 shows a block diagram of signal processing contained within an ultrasonic moving target rangefinder.

FIG. 2 shows a block diagram of the signal processing, which may be implemented, e.g., on processor 92 of FIG. 1B. The signal processing may be accomplished in dedicated digital logic or through firmware running on a microprocessor. Raw ultrasound data 200 consists of the digitized ultrasound time series data. While the ultrasound may be transmitted at a frequency from 40 kHz to 800 kHz, the baseband magnitude of the ultrasound signal may be stored as raw ultrasound data 200. This baseband magnitude may be obtained by several methods, such as an envelope detector or by complex demodulation wherein the in-phase (I) and quadrature (Q) components of the ultrasound signal are recorded as IQ pairs. The baseband sample rate of raw ultrasound data 200 may be in a range of 1 kHz to 200 kHz and more specifically in a range of 15 kHz to 150 kHz. The number of time-series samples contained in ultrasound data 200 is determined based on the sample rate and the desired maximum measurement range. Raw ultrasound data 200 contains the time-series corresponding to the current measurement while the time-series of the preceding measurement is stored in a 1-measurement buffer 202 which may be contained in SRAM data memory 94. A sum block 204 subtracts each sample of raw ultrasound data 200 from the corresponding sample of measurement buffer 202, creating a first-difference time-series. In the case that the baseband ultrasound signal is stored as complex IQ pairs, complex magnitude estimator 206 computes the magnitude of the IQ pairs stored in the first-difference time-series. The range from moving object 54 to the ultrasonic transceiver 6 may be measured by analyzing this first-difference time-series to determine the time-of-flight of the ultrasound echo returning from object 54.

In some implementations, additional signal processing may be performed on the first-difference time-series before finding the time-of-flight. In FIG. 2, a method to store the maximum value of N sequential time-series measurements is illustrated. The first-difference time-series is stored in a 1-measurement buffer 210 that is different from measurement buffer 202, which stores the previous time series for calculation of the difference between the previous and current time series. The 1-measurement buffer 210 stores the maximum difference signal. Maximum operator 208 compares each sample in the first-difference time series with the corresponding sample from a stored maximum difference signal buffer 210, and updates the maximum difference signal buffer 210 with the maximum of the comparison. Counter 212 periodically resets the maximum difference signal buffer 210 after N measurements. As a result, after several measurements, the maximum difference signal buffer 210 contains a maximum difference time-series. The period of counter 212 sets how many measurements N are used to create one maximum difference time-series which is used for subsequent range estimation.

Computation of the maximum difference signal may be further understood with reference to the pseudocode shown below.

Pseudo-code for maximum difference signal processing
CurrentData=[ . . . ] #array of current measurement data (I/Q baseband data)
PreviousData=[ . . . ] #array of previous measurement data
MaxDiff=[ . . . ] #array of max difference signal data
DiffTemp=0 #temporary variable for storing first difference

```
i=0 #index
N=3 #number of measurements to take the max difference
    of
count=0 #measurement count
# this code is run each time CurrentData is updated
for i from 0 to length(CurrentData)-1:
    if(count==0):
       MaxDiff[i]=0 #reset MaxDiff
    #calculate the complex magnitude of the first-order
       difference
    DiffTemp=complexMagnitude(CurrentData[i]-Previ-
       ousData[i])
    if(DiffTemp>MaxDiff[i]):
       MaxDiff[i]=DiffTemp #update MaxDiff if we find a
          larger difference
    PreviousData[i]=CurrentData[i]
    if(count==N):
       calculateTimeOfFlight(MaxDiff)
       count=0
    else:
       count=count+1
```

Figure 4:
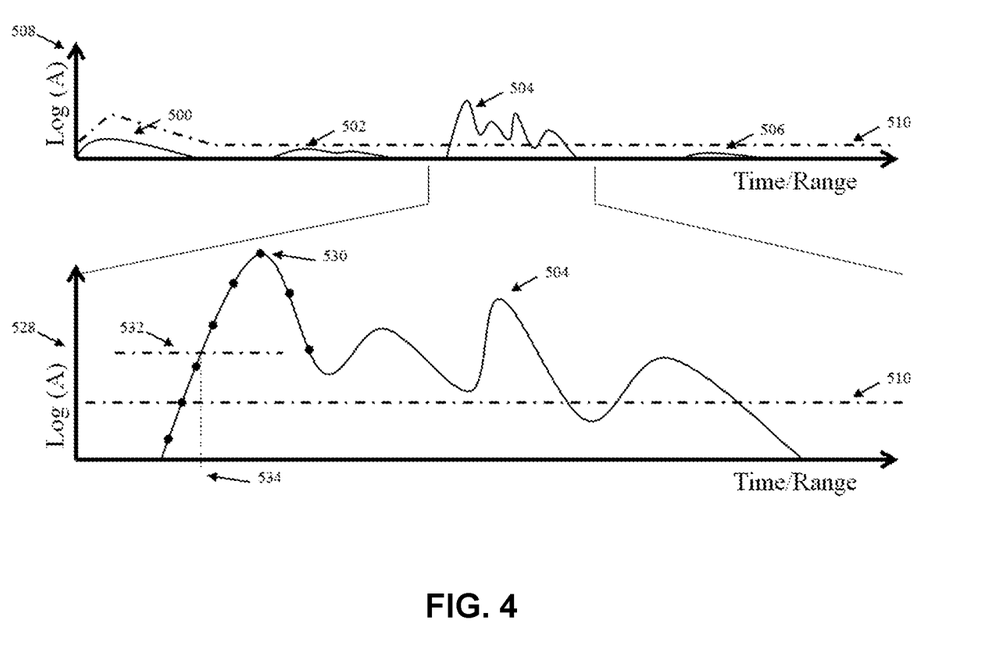
FIG. 4 shows a block diagram of an ultrasonic signal processor.

Those samples which have varying amplitude from measurement to measurement have a large maximum difference magnitude, while those samples which vary little do not have a large maximum difference magnitude. FIG. 4 illustrates the maximum difference time-series for the series of waveforms shown in FIG. 3. Plot 508 is a plot of the logarithm of the maximum difference time-series. The amplitudes of the difference signals 500, 502, 506 from stationary targets are substantially reduced, while the amplitude of the difference signal 504 from a moving object 54 is similar to the original amplitude of the signal 304 for moving object signal 54.

As shown in FIG. 4, the range to moving object 54 may be determined by finding the edge of the first peak in the maximum difference magnitude. Referring to FIG. 2, detection threshold block 214 is triggered by counter 212 after N measurements have elapsed. Detection threshold block 214 is designed to reject false targets due to noise or imperfectly canceled signals 500, 502, 506 from stationary targets. Referring to FIG. 4, a detection threshold level 510 is shown which corresponds to the threshold within detection threshold block 214. In some embodiments, the detection threshold 510 may be different for each sample or for a subset of samples. As an example, it may be advantageous to set threshold 510 to a large amplitude for the initial samples where the returning echoes have large amplitude and reduce the amplitude of threshold 510 as the sample index increases to compensate for attenuation in the returning echo signal amplitude. The detection threshold block 214 outputs the sample index at which the maximum difference magnitude crosses the detection threshold.

To provide increased resolution of the time-of-flight and greater insensitivity to the amplitude of the returning echo, the detection threshold block 214 may also output the samples near the detection threshold (indicated by dots in FIG. 4). Referring to FIG. 4, the interpolation block 216 may first find the maximum level of the signal 530, then compute the half-maximum level 532 for use as the detection threshold. Using the half-maximum level 532 provides greater insensitivity to variations in the maximum signal level 530. When a fixed threshold 510 is used, variations in the maximum signal level 532 will cause the signal to cross threshold 510 at different sample indexes, producing errors in the time-of-flight and therefore range measurement.

To determine the time-of-flight with finer resolution than the selected sample rate, rising edge interpolation block 216 may interpolate between samples that are near the detection threshold and return a fractional sample index. Referring to FIG. 4, the signal crosses the half-maximum level 532 at a time between the $3^{rd}$ and $4^{th}$ samples (corresponding to sample indices 3 and 4). Interpolation block 216 may use a successive approximation technique or linear interpolation to find the fractional index 534 at which the rising edge of the signal crosses half of the maximum level 532. Since fractional index 534 has finer resolution than the original sample rate it thereby provides a finer-resolution measurement of the time-of-flight and therefore range to the moving object 54.

The time-of-flight is calculated from a sum of the sample index and the interpolated fractional index divided by the sample rate of the ultrasound signal. The time-of-flight can be converted to range to the moving object 54 by multiplying by half the speed of sound. The maximum level of the maximum difference signal 530 may also be reported by the ultrasonic transceiver 6 as a measure of the measurement quality. When the maximum level 530 is large, it indicates a high-quality measurement that is significantly larger than the noise level of the system, whereas when the maximum level 530 is small it indicates that the measurement quality is poor. This information may be used by a subsequent range-finding algorithm which may choose to ignore range measurements with small maximum level 530 in order to reject errors that these low-quality measurements might introduce.

When the objects in front of ultrasonic transceiver 6 are stationary, the maximum difference signal will not cross detection threshold level 510. In this case, the ultrasonic transceiver 6 may report a time-of-flight value which indicates that no moving target was detected.

Figure 5:
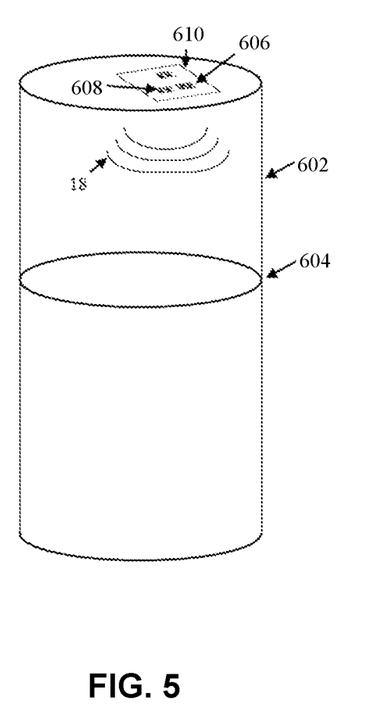
FIG. 5 shows two amplitude versus time plots of a processed ultrasound signal.

By way of non-limiting example, the ultrasonic transceiver 6 may be used to measure the level of a liquid inside a container. Referring to FIG. 5, a liquid container 602 contains a liquid 604. An ultrasonic transceiver 6 is located on electronic assembly 610 above the surface of the liquid inside container 602. Ultrasonic transceiver 6 may be triggered to emit several ultrasonic pulses 18 which reflect off liquid 604 and return to ultrasonic transceiver 6. Ultrasonic transceiver 6 converts the received ultrasound pulses 618 into a digital signal that is processed to extract the distance between ultrasonic transceiver 6 and liquid 604 as described above.

The measurement methods described herein overcome several challenges posed by measuring the level of liquid 604. First, surfaces of the container 602 may produce echoes that could interfere with the echo from liquid 604. Second, it is difficult to measure a liquid 604 that is very close to ultrasonic transceiver 6 (e.g. closer than 10 cm) because, in this case, the echoes from liquid 604 return to ultrasonic transceiver 6 shortly after the ultrasonic pulse is transmitted, during a "ring-down" time when ultrasonic transceiver 6 has not recovered from transmitting the pulse. Both of these problems are solved by the measurement method described herein because the liquid level is measured only when the liquid is moving (i.e. when the returning echo from the liquid surface changes from measurement-to-measurement). In contrast, echoes from the surfaces of container 602 and the ring-down signal of the ultrasonic transceiver 6 do not change significantly from measurement-to-measurement and are thus rejected by the measurement methods described herein.

Further details on how the measurement method may be applied to liquid level measurements are now provided. Liquid level 604 inside container 602 may move in a periodic fashion which is dependent on the size of the container and the viscosity of the liquid. The parameters of the measurement method described above may be selected based on information about this periodic motion. The measurement rate may be chosen such that the measurements are conducted at a rate above the Nyquist rate of the typical liquid oscillation frequency. Using a rate above the Nyquist rate ensures that range measurement errors due to aliasing do not occur. Similarly, because the maximum signal amplitude returning from liquid level 604 varies periodically with the liquid motion, it is desirable to ensure that one or more periods of liquid oscillation are recorded by the ultrasonic measurement so that the range measurement has high quality (i.e. maximum signal level 530 has large amplitude). This may be accomplished by choosing an appropriate value for N, the value stored in counter 212.

Figure 6:
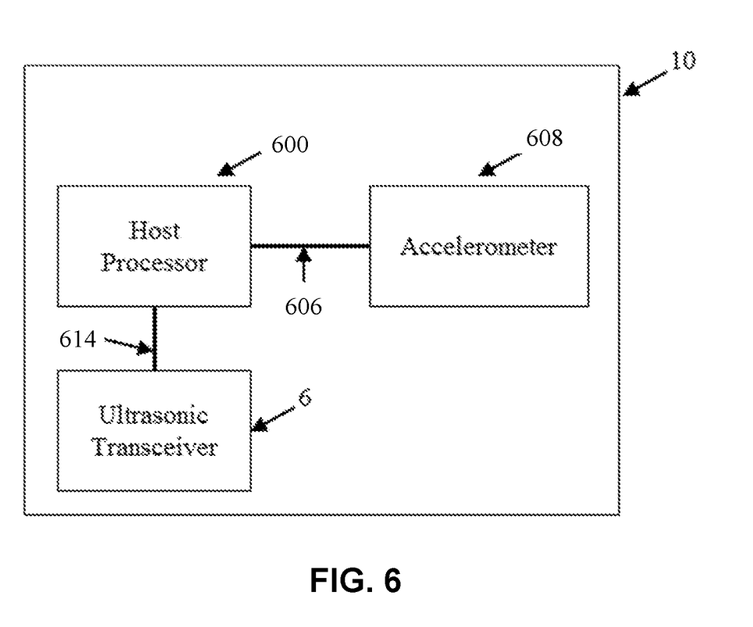
FIG. 6 shows a schematic isometric view of a container with liquid in it, a ultrasonic liquid level detector, and a wireless link to a portable computing device.

Referring now to FIG. 6. In certain embodiments, electronic assembly 610 may consist of a printed circuit board containing an ultrasonic transceiver 6, a motion sensor 608 (such as an accelerometer), and a host processor 600. The ultrasonic transceiver 6 may be connected to host processor 100 through a serial bus 614. The accelerometer 608 may be connected through a serial bus 606. In some embodiments accelerometer 608 may be replaced with a tilt sensor, gyroscope, or other motion sensing device.

In certain embodiments host processor 600 may be programmed to conduct ultrasonic range measurements only when motion above a certain threshold is detected by accelerometer 608. The host processor 600 may enter a low power (or standby) mode to save power between measurements. If an acceleration event is detected, accelerometer 608 may wake the host processor 600. For example, serial bus 614 may include a signal line connected to an interrupt processing unit on host processor 600, such that accelerometer 608 can cause an interrupt to occur on host processor 600 which will cause host processor 600 to enter an active state.

After processor 600 has entered an active state, it may monitor the acceleration data from accelerometer 608 periodically until the measured acceleration stops changing. At this point, the container 602 is stationary but the liquid 604 is still moving inside the container due to the previous motion. At this time if accelerometer 608 indicates the container is upright, the processor 600 may cause ultrasonic transceiver 6 to perform several ultrasonic measurements. During the ultrasonic measurement, processor 600 may enter a standby state until the completion of these measurements, at which time ultrasonic transceiver 6 may cause processor 600 to enter an active state by triggering an interrupt on host processor 600 using serial bus 614. Processor 600 may then retrieve liquid level data from ultrasonic transceiver 6 using serial bus 614. Ultrasonic transceiver 6 may then be configured to enter a low-power standby state by processor 600.

In a different embodiment, the electronic assembly 610 may not contain motion sensing device 608. In this embodiment, ultrasonic transceiver 6 may be periodically triggered by host processor 600 or ultrasonic transceiver 6 may autonomously trigger periodic measurements. A single trigger may cause several measurements to be taken until counter 212 triggers detection threshold block 214 to perform a range measurement. Ultrasonic transceiver 6 may be configured to trigger an interrupt on host processor 600 if a valid time-of-flight is measured, e.g. when the maximum amplitude 530 of the maximum difference time-series is greater than a pre-determined level. Since the maximum difference time-series amplitude is only large when a moving target is present, this ensures that the range measurements correspond only to the range of the moving liquid level and not to fixed features within the container 602.

Although the description herein contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art. For example, while circular embodiments are possible, the acoustic array elements may have many different shapes such as square, rectangular, hexagonal, octagonal, and so on. All such variations that would be apparent to one of ordinary skill in the art are intended to fall within the scope of this disclosure. It will also be appreciated that the drawings are not necessarily to scale, with emphasis being instead on the distinguishing features of the device disclosed herein.

All cited references are incorporated herein by reference in their entirety. In addition to any other claims, the applicant(s)/inventor(s) claim each and every embodiment of the invention described herein, as well as any aspect, component, or element of any embodiment described herein, and any combination of aspects, components or elements of any embodiment described herein.

What is claimed is:

1. A system for determining the distance to a moveable object or surface, comprising:
    an ultrasonic transducer;
    a circuit coupled to the ultrasonic transducer configured to cause the ultrasonic transducer to transmit ultrasound pulses and to receive signals from the ultrasonic transducer and store data corresponding to the received signals in a digital memory, the received signals corresponding to portions of the ultrasound pulses transmitted by the ultrasonic transducer that are reflected from the moveable object or surface; and
    a digital controller coupled to the circuit, wherein the digital controller is configured to implement a signal processing block which for each sample in a measurement calculates a difference between corresponding samples in data corresponding to received signal amplitudes for a current measurement and stored data corresponding to received signal amplitudes for a previous measurement to calculate a first difference signal and estimate a time of flight to a moving object, wherein the signal processing block is configured to calculate the maximum of each corresponding sample from first difference signals resulting from three or more measurements, and use a resulting maximum difference signal to estimate a time of flight to a moving object.

2. The system of claim 1, where the signal processing block is configured to estimate the time of flight from a rising edge of the maximum difference signal.

3. The system of claim 2, wherein the signal processing block is configured to interpolate between samples that are near a detection threshold to improve the time of flight estimate.

4. The system of claim 2 where the time of flight is estimated from a time at which the maximum difference signal crosses a threshold equal to half a maximum amplitude of the maximum difference signal.

5. The system of claim 1, wherein the signal processing block is configured to use the amplitude of the maximum difference signal as a measure of signal quality.

6. The system of claim 1, wherein the system is configured to determine a liquid level inside a container.

7. The system of claim 6, further including an acceleration sensor coupled to the digital controller configured to trigger an ultrasound measurement after an acceleration event.

8. An apparatus for determining the distance to a moveable object or surface, comprising:
   a circuit configured to transmit signals to and receive signals from the ultrasonic transducer and store data corresponding to the received signals in a digital memory, the received signals corresponding to portions of ultrasound pulses transmitted by the ultrasonic transducer and reflected from the moveable object or surface; and
   a digital controller coupled to the circuit, wherein the digital controller is configured to implement a signal processing block which for each sample in a measurement calculates a difference between corresponding samples in data corresponding to received signal amplitudes for a current measurement and stored data corresponding to received signal amplitudes for a previous measurement to calculate a first difference signal and estimate a time of flight to a moving object, wherein the signal processing block is configured to calculate the maximum of each corresponding sample from the first difference signals resulting from three or more measurements, and use the resulting maximum difference signal to estimate a time of flight to a moving object.

9. The apparatus of claim 8, where the signal processing block is configured to estimate the time of flight from a rising edge of the maximum difference signal.

10. The apparatus of claim 9, wherein the signal processing block is configured to interpolate between samples that are near a detection threshold to improve the time of flight estimate.

11. The apparatus of claim 8, wherein the signal processing block is configured to use the maximum difference signal as a measure of signal quality.

12. The apparatus of claim 8, wherein the system is configured to determine a liquid level inside a container.

13. The apparatus of claim 12, further including an acceleration sensor coupled to the digital controller configured to trigger an ultrasound measurement after an acceleration event.

14. A method for measuring the distance to a moveable object or surface, comprising:
   causing an ultrasonic transducer to transmit ultrasound pulses and receive portions of the ultrasound pulses that are reflected from the moveable object or surface and storing data representing corresponding receive signals in a digital memory with a circuit coupled to the ultrasonic transducer;
   for each sample in a measurement calculating a difference between corresponding samples in data corresponding to received signal amplitudes for a current measurement and stored data corresponding to received signal amplitudes for a previous measurement to calculate a first difference signal and estimate a time of flight to a moving object with a signal processing block implemented with a digital controller coupled to the circuit; and
   calculating the maximum of each corresponding sample from the first difference signals resulting from three or more measurements, and using the resulting maximum difference signal to estimate a time of flight to a moving object with the signal processing block.

15. The method of claim 14, further comprising estimating the time of flight from a rising edge of the maximum difference signal with the signal processing block.

16. The method of claim 15, further comprising interpolating between samples that are near a detection threshold to improve the time of flight estimate with the signal processing block.

17. The method of claim 14, further comprising using the maximum difference signal as a measure of signal quality with the signal processing block.

18. The method of claim 14, further comprising using the estimated time of flight to determine a liquid level inside a container.

19. The method of claim 18, triggering an ultrasound measurement of the liquid level with the circuit and signal processing block by measurement after an acceleration with an acceleration sensor coupled to the circuit.

\* \* \* \* \*